United States Patent [19] [11] 3,893,076
Clifford [45] July 1, 1975

[54] SPEED MEASUREMENT SYSTEM

[75] Inventor: Peter J. Clifford, Barrington, R.I.

[73] Assignee: Raytheon Company, Lexington, Mass.

[22] Filed: Oct. 18, 1973

[21] Appl. No.: 407,729

[52] U.S. Cl. .................................. 340/3 D; 343/8
[51] Int. Cl. ............................................ G01s 9/66
[58] Field of Search ............ 340/1 R, 1 C, 3 R, 3 D; 343/5 DP, 8, 9

[56] References Cited
UNITED STATES PATENTS
3,594,716   7/1971   Waterman .......................... 340/3 D
3,795,893   3/1974   Kritz et al. .......................... 340/3 D Primary Examiner—Richard A. Farley
Attorney, Agent, or Firm—David M. Warren; Joseph D. Pannone; Milton D. Bartlett

[57] ABSTRACT

A system adapted for the measurement of ship's speed by utilizing the doppler shift imparted to sonic energy reflected from the bottom of a body of water or from sources of reflection within the water itself. Pulsed sonic transmissions are directed from the ship at an angle to the vertical to provide a forward or aft component to the received doppler frequency signal. The received signal is translated to an intermediate frequency lower than the received frequency and the elapsed time of a predetermined number of cycles at the intermediate frequency in each of a succession of received pulse signals is measured. After ascertaining the equality of successive ones of these measurements, the system provides for the storing of successive ones of these measurements and the generation of a periodic pulse train signal having a frequency dependent on these measurements. The pulses of the pulse train wave are then counted during fixed time intervals to provide a number representing the doppler frequency shift and the corresponding speed of the ship.

15 Claims, 6 Drawing Figures

SPEED MEASUREMENT SYSTEM

Background of the Invention

Ship's speed is frequently measured by means of doppler sonar systems in which a beam of sonic energy is directed downwardly towards the bottom of a body of water in which the ship is sailing to provide reflections from the bottom, the beam of sonic energy also being directed in a direction forward or aft of the ship so that echoes received from the ocean bottom acquire a doppler frequency shift in accordance with the speed of the ship.

A problem arises in measuring the doppler frequency shift provided by the typical pulse doppler sonar system in which measurements of the doppler frequency must be made during the relatively short duration of the pulses of sonic energy while no information is provided during the relatively long interpulse intervals. For example, voltage controlled oscillators utilized in phase locked loops for processing the carrier frequency of such sonar signals require some form of sample and hold circuit for maintaining the oscillator frequency during the interpulse intervals, this resulting in the well-known tendency of such oscillators to experience a frequency drifting during the inter-pulse intervals.

A further problem experienced in measurement of doppler frequency with pulse doppler sonar systems results from the fact that such systems are frequently operated in an environment of external noise such as that produced by the ship's screws and turbulent flow and, accordingly, some or many of the received echoes may give a poor measurement of doppler frequency because of excessive noise. Such a problem may be acute in a sampled phase locked loop receiving system in which an input signal to the loop is available only during the relatively short durations of the received pulses.

SUMMARY OF THE INVENTION

The foregoing problems are overcome and other advantages are provided by a speed measurement system in accordance with the invention which provides for the sequential transmission and reception of sonar signals. These signals are directed in narrow beams in an angular direction relative to the hull of a ship traveling through a body of water so that the radiant energy is directed both in a downwards direction and in a direction along the longitudinal axis of the ship. Thus, reflections of this radiant energy from the ocean bottom or from eddies and other sources of reflection in the water itself acquire a doppler frequency shift in accordance with the speed of the ship through the body of water. In a preferred embodiment of the invention a pair of transmitting transducers are utilized for directing their radiant energies respectively with a forward and reverse component along the roll axis of the ship to provide positive and negative doppler frequency shifts which, when subtracted from each other, provide a measure of the ship's speed which is substantially invariant to a pitching motion of the ship. The signal received from each of the transducer transmissions is translated to a lower value of frequency whereupon the duration of a predetermined number of the cycles of the signal is measured. The measurement is repeated during each of the received echoes, and a comparator compares the values of these successive measurements. An equality of the successive measurements indicates the presence of measurements that are sufficiently free of noise to provide good speed data. The successive values of the measurements are then stored and utilized for providing a periodic oscillation having a frequency greater (typically greater by a few orders of magnitude) than the repetition frequency of the transmitted sonar signal, the frequency being dependent on the magnitude of these successive measurements. In this way, the pulsed received signals are converted to a periodic signal analogous to a sampled continuous wave signal which is suitable for the measurement of doppler frequency. The periodic signals derived from the echoes of the transmissions from the pair of transducers are then combined in a manner in which the doppler frequency of one of the periodic signals is subtracted from the doppler frequency of the other periodic signal. For example, this may be conveniently accomplished with an up-down counter coupled to a rate multiplier and a fixed frequency oscillator in which the frequency of the oscillator is multiplied by the count of the up-down counter. The resultant oscillation having the doppler frequency modulation thereon is then applied to a counter which counts the cycles of this oscillation for a predetermined interval of time to provide the number of cycles per unit of time, this being proportional to the ship's speed.

BRIEF DESCRIPTION OF THE DRAWINGS

The aforementioned aspects and other features of the invention are explained in the following description taken in connection with the accompanying drawings wherein.

DESCRIPTION OF THE PREFERRED EMBODIMENT

Figure 1:
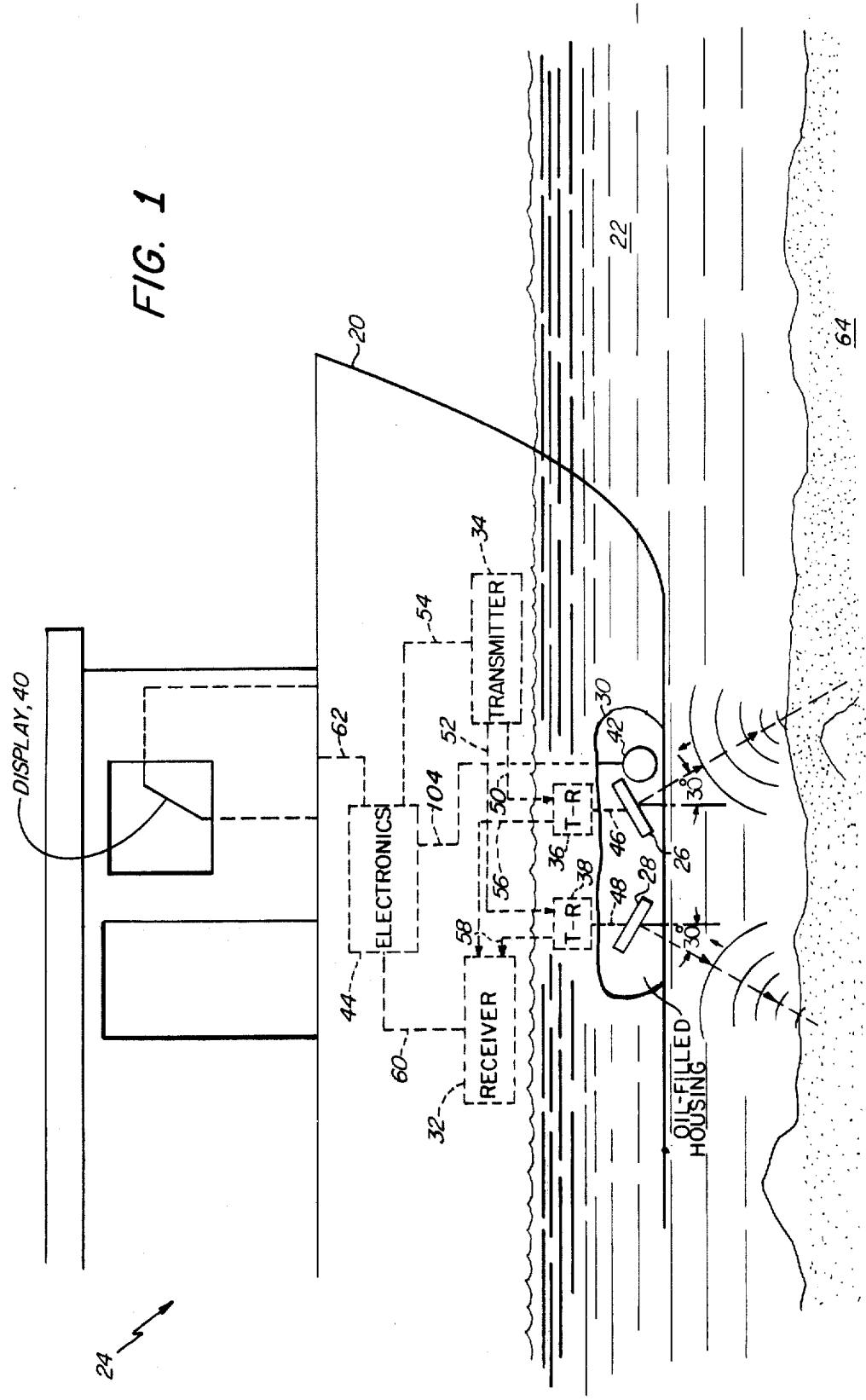
FIG. 1 shows a pictorial view of a ship carrying the speed measurement system of the invention.

Referring now to FIG. 1 there is seen a pictorial view of a ship 20 sailing on the ocean 22 and carrying a speed measurement 24 which, in accordance with the invention, is seen to comprise a forward transducer 26 and an aft transducer 28 which are enclosed in an oil-filled housing 30 which couples sonic energy between the transducers 26 and 28 and the water of the ocean 22. The system 24 also comprises a receiver 32, a transmitter 34, T-R circuits 36 and 38 for coupling sonic energy between the receiver 32 and the transmitter 34 to respectively the forward transducer 26 and the aft transducer 28, a display 40 seen in the cabin of the ship 20, a temperature measuring device such as a thermistor 42 positioned within the oil of the oil-filled housing 30, and an electronics unit 44 coupled to the receiver 32, the transmitter 34, the display 40 and the thermistor 42. The electronics unit 44 generates signals for transmission by the transmitter 34 and processes the doppler frequency shifts obtained on signals incident upon the transducers 26 and 28 for providing upon the display 40 a measurement of the speed of the ship 20.

The transducer 26 is coupled to the T-R circuit 36 via line 46 and the transducer 28 is coupled to the T-R circuit 38 via line 48. The transmitter 34 is coupled to the T-R circuit 36 via line 50, to the T-R circuit 38 via the line 52, and to the electronics unit 44 via the line 54. The receiver 32 is coupled to the T-R circuit 36 via line 56, to the T-R circuit 38 via the line 58, and to the electronics unit 44 via cable 60, the electronics unit 44, in turn, being coupled to the display 40 via cable 62.

The transducers 26 and 28 are oriented to transmit their respective beams of acoustic energy at angles of 30° respectively forward and aft of a normal to the keel of the ship 20. The beams of acoustic energy are sufficiently narrow to reduce the amount of reverberation, a beam width of 4° being used in the preferred embodiment. This sonic energy is incident upon the bottom 64 of the ocean 22 and reflects therefrom in a number of directions such that a portion of the reflected sonic energy is redirected back towards the transducers 26 and 28. Due to the 30° orientations of these beams of sonic energy, each beam has a component thereof directed along the longitudinal axis of the ship 20 with the result that forward or reverse movement of the ship 20 provides a doppler shift to the frequency of the reflected energy. In the case of forward motion of the ship 20, the beam of energy coupled to the forward transducer 26 experiences a positive doppler shift while the beam coupled to the aft transducer 28 experiences a negative doppler shift. This orientation of the transducers 26 and 28 is convenient in that it tends to cancel out variations in doppler frequency which result from a pitching motion of the ship 20, this cancellation being obtained by subtracting the doppler shift associated with the aft transducer 28 from the doppler shift associated with the forward transducer 26.

Figure 2:
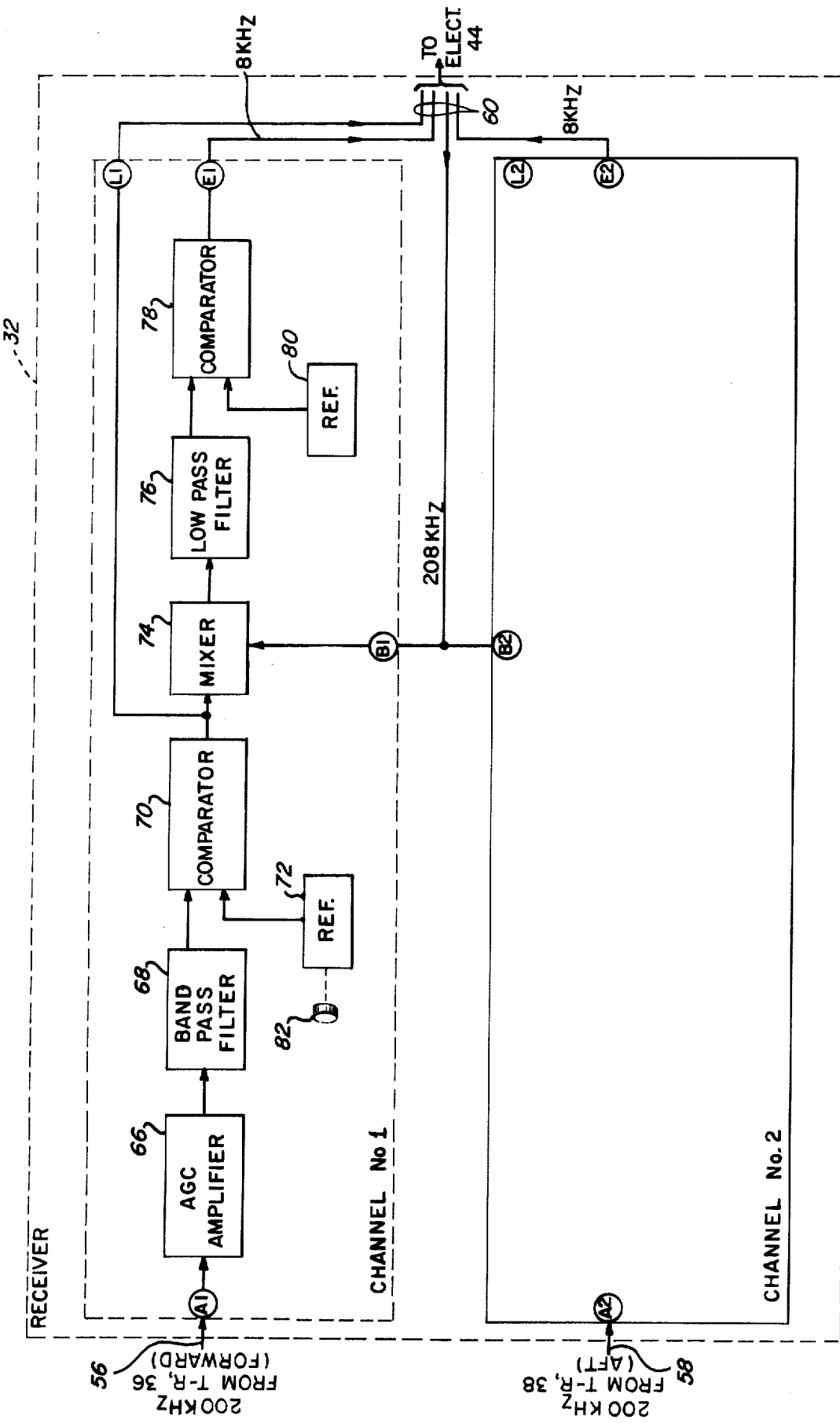
FIG. 2 is a block diagram of a receiver of FIG. 1.

Referring now to FIG. 2, the receiver 32 is seen to comprise two channels each of which comprises an amplifier 66 having automatic gain control, a band pass filter 68, a comparator 70 for comparing the output signal of the band pass filter 68 to the signal of a reference signal source 72, a mixer 74, a low pass filter 76 and a second comparator 78 and second reference signal source 80. Each channel of the receiver 32 is seen to have four signal terminals designated by the letters A, B, E and L, these terminals further being designated by the numerals 1 and 2 which will be used hereinafter when it is desired to indicate the particular channel wherein a terminal is found. Thus, the input signals to the receiver on lines 56 and 58 are seen to be coupled to the terminals A1 and A2 while output signals at terminals E1, E2 and L1 are seen to be passed by cable 60 to the electronics unit 44. A signal for the mixer 74 is coupled to the terminals B1 and B2 by a conductor within the cable 60.

By way of example, in the preferred embodiment of the invention, the transmitted and received signals comprise a pulsed carrier having a nominal frequency of 200 kHz (kilohertz). This frequency changes on reception at the transducers 26 and 28 by a doppler frequency shift imparted by the motion of the ship 20 of FIG. 1. With respect to channel No. 1, (similar comments applying to channel No. 2) the received signal is amplified by the amplifier 66 to a suitable level to operate the comparator 70. The filter 68 has a pass band of approximately 5 kHz centered at 200 kHz. Relatively strong signals at the output of the filter 68 having an amplitude greater than the value of the signal of the reference source 72 excite the comparator 70 to provide at its output a logic 1 or high signal, both terms to be used synonomously herein, while a logic 0 signal or low signal is provided by the comparator 70 in response to a relatively low signal at the output of the filter 68 having a value less than the signal of the reference source 72. Thus, the comparator 70 serves to differentiate between signals which are of greater amplitude than the background noise level to ensure increased fidelity to the measurement of the ship's speed. The reference source 72 is provided with a knob 82 to permit manual adjustment of the value of the reference signal.

The digital waveform signal emanating from the comparator 70 has a pulse repetition frequency equal to that of the signal incident at terminal A when the signal at terminal A is sufficiently strong to operate the comparator 70. Otherwise the output of the comparator 70 remains at a logic 0 state so that no signal is incident upon the mixer 74. In the ensuing discussion it is assumed that the signal incident at terminal A is strong enough to operate the comparator 70 in which case the 200 kHz signal having a digital waveform is combined in the mixer 74 with a referenced square wave signal having a pulse repetition frequency of 208 kHz to provide an output from the mixer 74 having signals one of which is at a carrier frequency or pulse repetition frequency of 8 kHz. The low pass filter 76 has a cut-off frequency slightly above 8 kHz to transmit the 8 kHz signal to the comparator 78 while excluding other products of the mixing operation. As an example in the construction of the mixer, the preferred embodiment utilizes simply an exclusive OR gate to provide the 8 kHz signal. The comparator 78 and the reference source 80 function in a manner analogous to that of the comparator 70 and the reference source 72 and are utilized for converting the substantially sinusoidal waveform of the output of the low pass filter 76 into a square wave or digital waveform type signal of the same repetition frequency, this digital signal appearing at terminal E.

The output of the first comparator 70 is also coupled to terminal L and will be utilized in a manner to be seen hereinafter for measuring the depth of the ocean 22 of FIG. 1.

By way of example, in the preferred embodiment, the maximum pulse width utilized for pulses of sonic energy transmitted by the transmitter 34 of FIG. 1 is 24 milliseconds and is utilized at depths greater than 100 feet. At shallow depths, the pulse width is decreased so that at a depth of only 4 feet, a 1 millisecond pulse width is utilized. Also, the pulse repetition frequency is selected in accordance with the anticipated depth of the ocean 22 with a repetition frequency of 2 pulses per second being utilized at depths in the range of 200 feet to 1000 feet while a repetition frequency of 10 pulses per second is utilized at the shallower depths. The increased repetition frequency in shallow waters compensates for the lesser amount of energy carried by the shorter pulses and thereby provides for a total amount of energy received per second which is adequate for a precise measurement of the depth.

Figure 3:
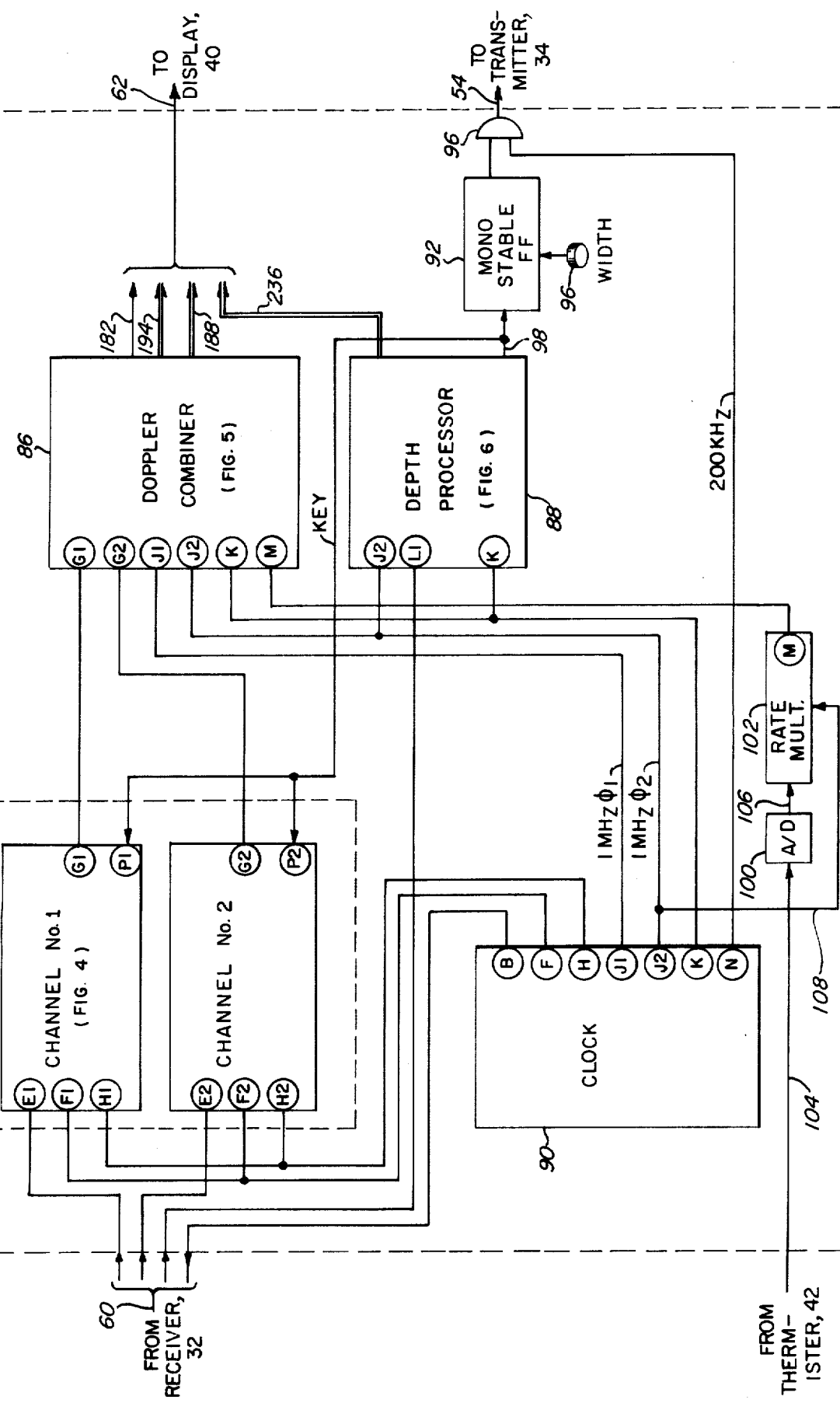
FIG. 3 is a block diagram of an electronics unit of FIG. 1 for extracting doppler data from signals received by the receiver of FIG. 1 and for providing signals to be transmitted by a transmitter of FIG. 1.

Referring now to FIG. 3 there is seen a block diagram of the electronic unit 44 which is seen to comprise an extractor 84 of doppler data having two channels for processing doppler data obtained from the signals provided by the two channels of the receiver 32, a combiner 86 of doppler data for combining the data provided by the two channels of the extractor 84, a processor 88 of signals provided by the receiver 32 for measuring the depth of the ocean 22, and a clock 90 which provides the signal to terminal B at each channel of the receiver 32 as well as clock signals to the other units within the electronics unit 44. The electronics unit 44 is also seen to comprise a monostable flip-flop 92 providing a pulse which may be varied by turning a knob 94, and an AND gate 96. The clock 90 provides at its terminal N a 200 kHz square wave signal which is passed by the AND gate 96 during the duration of the pulse provided by the flip-flop 92. Thus, a pulsed 200 kHz carrier signal is provided on line 54 to be amplified by the transmitter 34 of FIG. 1 and thence radiated by the transducers 26 and 28. The flip-flop 92 is triggered by a signal on line 98 provided by the processor 88 in a manner to be described hereinafter with reference to FIG. 6. The clock 90 is also seen to provide a 1 MHz (megahertz) signal from terminal J1 and also from terminal J2, the two signals differing in that the signal at J1 is at a first phase angle while the signal at J2 is at a second phase angle, the two phases being utilized to permit the two signals to be applied simultaneously to an up-down counter of the combiner 86 in a manner to be described hereinafter with reference to FIG. 5. The clock signals provided at terminal J2 will be utilized in a manner to be described for measuring the propagation time of a signal in the ocean 22.

In order to compensate for the variation in the propagation speed of sonic energy in the ocean due to variations in temperature as sensed by the thermistor 42 of FIG. 1, an analog-to-digital converter hereinafter referred to as converter 100, a rate multiplier 102 are utilized for altering the average value of the repetition frequency of the clock signal of terminal J2. The thermistor 42 provides an analog signal which is coupled to the converter 100 via line 104. The converter 100 provides a digital number on line 106 representing the magnitude of the analog signal on line 104. The rate multiplier 102 receives clock pulses on line 108 from terminal J2 and a digital number on line 106 representing the magnitude of the water temperature of the ocean 22. The rate multiplier 102 is a well-known device such as a commercially available unit from Texas Instruments having part No. SN7497 and provides a succession of pulses at terminal M having an average pulse repetition frequency which is proportional to the repetition frequency of the clock pulses on line 108 and is also proportional to the magnitude of the digital number on line 106. The thermistor 42 senses the temperature of the oil within the housing 30 of FIG. 1, the temperature of the oil providing an adequate correction for the clock pulses at terminal M independently of a differing temperature in the water of the ocean 22 since a difference in temperature between the water of the ocean 22 and the oil within the housing 30 causes a differing amount of refraction of sonic energy at the surface of the housing 30 which compensates for the difference in temperature and thus provides a proper correction for the clock signal at terminal M.

Also seen in FIG. 3 are connecting lines which connect the terminals of the clock 90 to various terminals in the other units within the electronics unit 44. Thus, it is seen, by way of example, that terminal F of the clock is coupled to terminals F1 and F2 respectively of channels No. 1 and No. 2 of the extractor 84.

Figure 4:
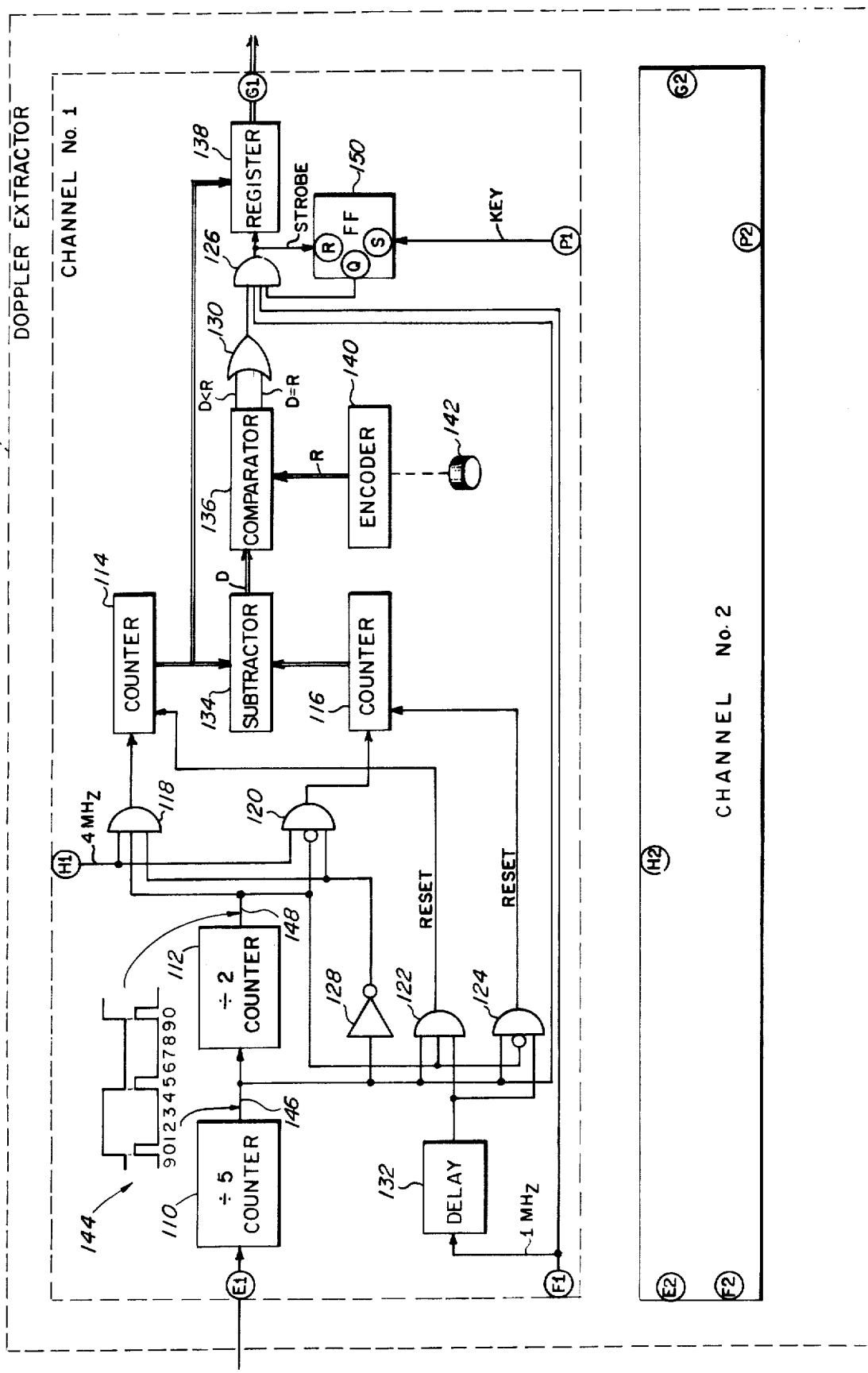
FIG. 4 is a block diagram of a doppler extractor of FIG. 3 for extracting doppler data from the receiver of FIG. 1.

Referring now to FIG. 4 there is seen a block diagram of the extractor 84 of FIG. 3. The extractor 84 has two identical channels, each of which has terminals F, G, E, H, and P, each of the terminals being further identified by the numerals 1 and 2 to indicate that the terminals are a part of channel No. 1 or channel No. 2. Referring now particularly to channel No. 1, it is seen that the extractor 84 comprises counters 110, 112, 114 and 116, AND gates 118, 120, 122, 124 and 126, a digital inverter 128, an OR gate 130, a delay unit 132, a subtractor 134, a comparator 136, a register 138, and an encoder 140 having a knob 142 for setting in a digital number. The extractor 84 provides for a measurement of the temporal duration of a fixed number of cycles, for example, four cycles of the signal at terminal E1. In addition, the extractor 84 of the preferred embodiment provides for a pair of these measurements which are stored in the counters 114 and 116, and a comparing of the two measurements by the subtractor 134 to establish the extent to which the two measurements agree. An agreement or substantial agreement of two subsequent measurements indicates that the signal is substantially free of noise and that an accurate measurement can be obtained. Thus, for example, in a situation of high reverberation where the signal at terminal E1 is partially obscured by these reverberations, the extractor 84 will disregard the measurements of the four cycle interval thereby ensuring that only measurements substantially free of noise are presented at its output at terminal G1. It is to be noted that in the mixing accomplished in the receiver 32 of FIG. 2 wherein the 200 kHz signal is translated down to 8 kHz, the doppler phase shift and doppler frequency shift is preserved during the mixing operation. However, since the measurement is being made on cycles of a carrier at 8 kHz rather than on a carrier at 200 kHz, the measurement can be made with a substantial increase in precision and accuracy.

The counters 110 and 112 are utilized for establishing measurement intervals and, with the aid of the AND gates 118, 120, 122 and 124, activate the counters 114 and 116 to make consecutive measurements of successive four cycle intervals of the 8 kHz signal at terminal E. In view of the 5 kHz bandwidth of the receiver 32, the durations of the four cycle intervals at 8 kHz are sufficiently long to represent independent samples of the signals received at the transducers 26 and 28 of FIG. 1. The counter 110 is a divide-by-five counter which, as is shown in the lower portion of the graph 144, provides a pulse signal on line 146 in which there is a high signal persisting during a count of zero followed by a low signal persisting during the count of zero followed by a low signal persisting during the counts 1–4 followed by a high signal at count 5 and a low signal at counts 6–9. The counter 112 is a divide-by-two counter which provides on line 148 alternating high and low signals over consecutive intervals of five counts as is seen in the graph 144.

The signal on line 148 is applied to the counters 114 and 116 via AND gates 118, 120, 122 and 124 with this signal being complemented at the input to the AND gates 120 and 124. Because of the complementing of the signal at the inputs to the AND gates 120 and 124, the AND gates 118 and 120 are alternately activated by the signal on 148, and similarly the AND gates 122 and 124 are alternately activated by the signal on line 148. The AND gates 118 and 120 are coupled respectively to the clock inputs of the counter 114 and 116 to provide, accordingly, alternate activation of the counters 114 and 116 for making the consecutive measurements of the four cycle intervals of the signal at terminal E1. It is desirable to provide a dead time between the successive measurements to permit a comparing of these measurements and a resetting of the counters 114 and 116. Accordingly, the signal on line 146 is also coupled to the AND gates 118, 120, 122 and 124 with the signal being coupled via the inverter 128 which complements this signal prior to its application to the AND gates 118 and 120. Thus it is seen that the counter 110 provides a low pulse signal to the AND gates 118 and 120 while providing a high pulse signal to the AND gates 122 and 124. The low pulse signal applied to the AND gates 118 and 120 provides for the aforementioned dead time by deactivating the AND gates 118 and 120 during the counts of 0 and five as shown in the graph 144. And while the AND gates 118 and 120 are being deactivated during the counts of 0 and 5, the AND gates 122 and 124 are activated to provide for a resetting of the counters 114 and 116 to 0.

The counter 110 counts the individual pulses provided by the comparator 78 of FIG. 2 while the counters 114 and 116 count a 4 MHz clock pulse signal provided at terminal H by the clock 90 of FIG. 3 with the resetting of the counters 114 and 116 being provided by a clock pulse of the 1 MHz clock pulse signal at terminal F which is provided by the clock 90. The counter 110 counts modulo-5 and provides a high pulse signal during each count of 5. Thus, as was mentioned before, on a scale of 10 as seen in the graph 144, the pulses of the counter 110 occur during each count of 0 and during each count of 5. The counter 112 counts each of the pulses provided by the counter 110.

In operation therefore it is seen that with the appearance of a signal at terminal E, the counter 110 begins counting at whatever count it may have previously terminated counting with the result that the AND gates 118 and 120 are alternately activated, the AND gate 118 being activated to pass clock pulses from terminal H to the counter 114 during the count interval from 1 to 4. The counter 116 is activated during the count interval from 6 to 9 as seen in the graph 144. The counter 114 is reset during the count of 0 and the counter 116 is reset during the count of 5. Thus, during the count interval from 1 to 4, when the signal on line 148 is high and the signal on line 146 is low, the clock pulses from terminal H pass through the gate 118 and are counted by the counter 114. During the count interval 6 to 9 when the signal on line 148 is low and the signal on line 146 is also low, the pulses of the clock pulse signal at terminal H passes through the AND gate 120 to be counted by the counter 116.

The subtractor 134 continuously subtracts the counts appearing in the counters 114 and 116. The outputs of these counters are shown as heavy lines to indicate a set of lines, one line for each bit or digit of the count. Heavy lines are similarly employed elsewhere in the drawings to so indicate a set of lines. Since one of the two counters 114 or 116 begins to count first, the subtractor 134 shows a difference indicated by the letter D in the figure which is greater than the value of R, the reference input to the comparator 136. For example, the value of R may be set equal to 2 by the knob 142 and the encoder 140. Thus if the subtractor shows a difference equal to 2 or less than 2, a signal is passed by the comparator 136 through the OR gate 130 to the AND gate 126. The activation of the AND gate 126 permits a clock pulse from terminal F1 to strobe the register 138. An additional flip-flop 150 is provided for deactivating the AND gate 126 after the strobing of the register 138. The flip-flop 150 is set by the KEY signal on line 98 of FIG. 3 and coupled to the flip-flop 150 via terminal P. As will be described hereinafter with reference to FIG. 6, the KEY signal initiates each transmission of sonic energy from the transducers 26 and 28 of FIG. 1. The flip-flop 150 is reset by the strobe signal at the output of the AND gate 126 thereby ensuring that the register 138 is strobed only once for each of the transmissions of sonic energy. This provides immunity to signals received from reverberations in the ocean 22. In addition, the signal on line 146 is applied to the AND gate 126 to ensure that the strobing of the register 138 occurs only during the aforementioned dead time. If desired, additional counters (not shown) may be utilized in conjunction with the counters 114 and 116 to provide a comparison between three or more measurements to provide further immunity from noise and reverberations.

It is noted that data is continuously stored in the register 138 until such time as new data, verified as accurate by the comparison of the counts in the counters 114 and 116, is entered via the AND gate 126 into the register 138. Thus, while the system of the present invention contemplates the use of a pulsed doppler sonar wherein no data is received except at such instances when an echo of sonic energy is incident upon the transducers 26 and 28, the register 138 serves as a storage medium for making available continuously the data previously obtained until such time as the data is updated. Thus, the extractor 84 accomplishes the function of a frequency tracker and represents a significant improvement over analog phase locked tracking systems of the prior art which attempt to phase lock on whatever data is present, without the data verification means of the present system, and which tend to drift during periods of no data. The present system is not subject to such drift since it utilizes stored data at times when no new data is available.

Figure 5:
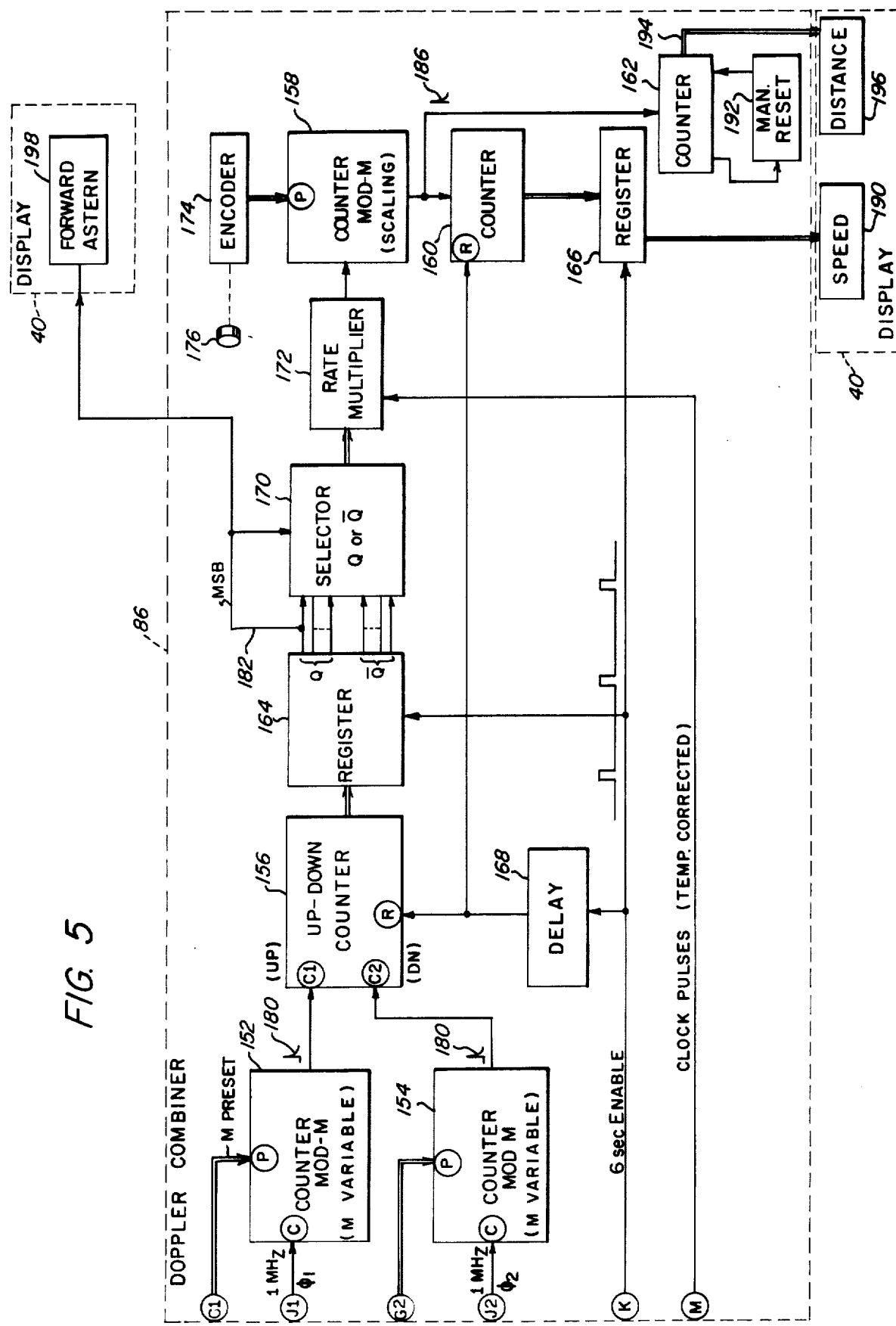
FIG. 5 is a block diagram of a doppler combiner of FIG. 3 for combining the doppler data obtained from signals received by each of two transducers shown in FIG. 1.

Referring now to FIG. 5 there is seen a block diagram of the combiner 86 having terminals G1, G2, J1, J2, K and M for interconnection with the correspondingly identified terminals shown in FIG. 3. The combiner 86 comprises counters 152, 154, 156, 158, 160 and 162, registers 164 and 166, a delay unit 168, a selector 170, a rate multiplier 172, and an encoder 174 with a knob 176 for selecting a number in the encoder 174. The counters 152 and 154 are identical, each being a modulo-M counter which is preset to the number M at its terminal P, and each continuously counts the clock pulses incident at terminal C while providing an output pulse signal 180 whenever a count of M is obtained. It is noted that the clock pulses applied to the counter 152 are obtained from terminal J1 of the clock 90, these clock pulses arriving at a repetition frequency of 1 MHz while the clock pulses for the counter 154 are obtained from the terminal J2, these clock pulses also being at a frequency of 1 MHz but shifted in phase relative to the clock pulses at terminal J1. This difference in phase is indicated in the drawing by the symbols $\phi_1$ and $\phi_2$. The counter 152 is preset with the number stored in the register 138 of the first channel of the extractor 84 of FIG. 4 and coupled via terminal G1 while the counter 154 is preset by the corresponding register of channel 2 and coupled via the terminal G2. As was mentioned previously with respect to FIG. 4, the register 138 in channel No. 1 as well as the corresponding register in channel No. 2 have numbers continuously stored therein so that the two counters 152 and 154 continually count modulo the respective numbers to which they have been preset until the data stored by the respective registers 138 is updated at which time the counters 152 and 154 count modulo the new data.

As was mentioned hereinbefore, the data in the sonic energy incident upon the forward transducer 26 and processed by the first channel of the extractor 84 shows a positive doppler frequency shift for a forward motion of the ship 20, while the data in sonic energy incident upon the aft transducer 28 and processed by the second channel of the extractor 84 shows a negative doppler frequency shift. To combine the doppler data of the first and second channels, the second channel data is subtracted from the first channel data by means of the up-down counter 156. The output pulse signals 180 of the counter 152 are applied to the C1 clock input terminal of the counter 156. The counter 156 is an up-down counter which counts up the pulses incident at the clock input terminal C1 while counting down pulse signals incident at the clock input terminal C2. The output pulse signals 180 of the counter 154 are applied to the clock terminal C2 with the result that the total count attained by the counter 156 is proportional to the difference between the repetition frequencies of the output pulse signals 180 of the counter 152 and 154. The pulse signals 180 incident at the clock terminal C1 arrive at the terminal C1 at times different from the pulse signals 180 incident at terminal C2 due to the relative phasing of the clock signals at the terminals J1 and J2 thereby precluding the situation in which the counter 156 would be required to count simultaneously upwardly and downwardly.

The measurement of doppler frequency obtained by the counter 156 is averaged over an interval of time, for example, six seconds in the preferred embodiment. A timing signal provided by the clock 90 at terminal K comprises a succession of clock pulses spaced apart by 6 second intervals. The signal at terminal K is supplied via the delay unit 168 to the reset terminals of the counters 156 and 160 to clear these counters at the end of each of the 6 second intervals. Thus, the total count accumulated by the counter 156 is proportional to the total doppler phase shift accumulated over a 6 second interval, this interval being sufficiently long to substantially diminish the effects of noise and reverberation.

To determine whether the total count of the counter 156 represents a positive or negative number, the count is strobed into the register 164 by the 6 second clock signal at terminal K. The delay unit 168 provides sufficient delay to permit completion of the strobing before resetting the counter 156. The register 164 stores the count and provides a pair of output lines, one set of lines designated as the Q output being the same number as was entered into the register 164 from the counter 156, while the second output designated $\overline{Q}$ represents a set of lines in which digit of the stored count has been complemented. As is well known, the complement of the number approximately equals 1 minus the number, there being an error only in the least significant bit which error is negligible for large values of count of the counter 156. For example, in the preferred embodiment the counter 156 provides a 12-bit binary number while the maximum count for 40 knots of ship's speed during the 6 second counting interval is less than 2048, this being an 11-bit number. In the event that the ship 20 of FIG. 1 is moving in reverse, a count of 4096 would initially be registered with subsequent counts registering a number less than 4096 but greater than 2048 in which case the twelfth bit is high. The twelfth bit is the MSB (most significant bit) which bit is communicated via line 182 to the selector 170 for activating the selector 170 to select the Q or complemented output of the register 164. The selector 170 is a well known electronic switch for selecting one of two groups of binary signals. The number selected by the selector 170 is applied to the rate multiplier 172.

The rate multiplier 172 is of the same form as the rate multiplier 102 previously described. Accordingly, in response to the temperature corrected clock pulses of terminal M being applied to the rate multiplier 172, there appears at the output of the rate multiplier 172 on line 184 a train of clock pulses having an average frequency which is proportional to the digital number applied at the input of the rate multiplier 172 by the selector 170. Accordingly, the average repetition frequency of the pulses appearing on line 184 represents a recreated carrier doppler frequency shift which is compensated for the temperature of the water of the ocean 22.

In order to scale the average repetition frequency of the pulse signal on line 184 to provide output data in terms of feet per second or knots, a counter 158 which is preset at its terminal P with a digital number from the encoder 174 is utilized. The counter 158 counts modulo-M, the number M being the number to which the counter 158 has been preset. Each time the counter 158 attains a count of M, it provides a pulse 186 at its output. The pulses 186 occur with an average repetition frequency proportional to the average repetition frequency of the pulses on line 184.

As is well known from the nature of the gating and flip-flop circuitry within a rate multiplier such as the rate multiplier 172, there is a substantial variation in the intervals between successive ones of the pulses on line 184 while the count of a large number of these pulses over a long interval of time including many of these pulses is a very accurate measure of elapsed time. The counter 158 essentially provides the repetition frequency of the pulses on line 184 by the number M which substantially smoothes out the aforementioned irregularity in the instantaneous repetition frequency of the pulses on line 184 to provide an averaging over M pulses of the signal on line 184, this resulting in a smooth repetition rate of the pulses 186.

The pulses 186 are then counted over the aforementioned six second interval to give a total count which represents the speed of the ship 20, which speed data is communicated via line 188 to the display 40 for showing the speed on an indicator 190. The 6 second signal at terminal K strobes the count of counter 160 into the register 166 and then, after the aforementioned delay of the delay unit 168, resets or clears the counter 160. The doppler data is stored in the register 166 for activating the speed indicator 190 until such time as the register 166 is updated.

The distance traveled by the ship 20 is also provided by counting the pulses 186 over the duration of the time of travel of the ship 20. This counting is accomplished by the counter 162 which is reset by a manual reset 192 at the beginning of the trip of the ship 20. The total count accumulated by the counter 162 at any instant of time represents the distance traveled by the ship up to that time and is communicated via lines 194 to the display 40 to be shown on an indicator 196. Also shown on the display 40 via an indicator 198 is an indication as to whether the ship 20 is traveling forwards or in reverse, this data being coupled by the MSB signal on line 182 to the indicator 198.

Figure 6:
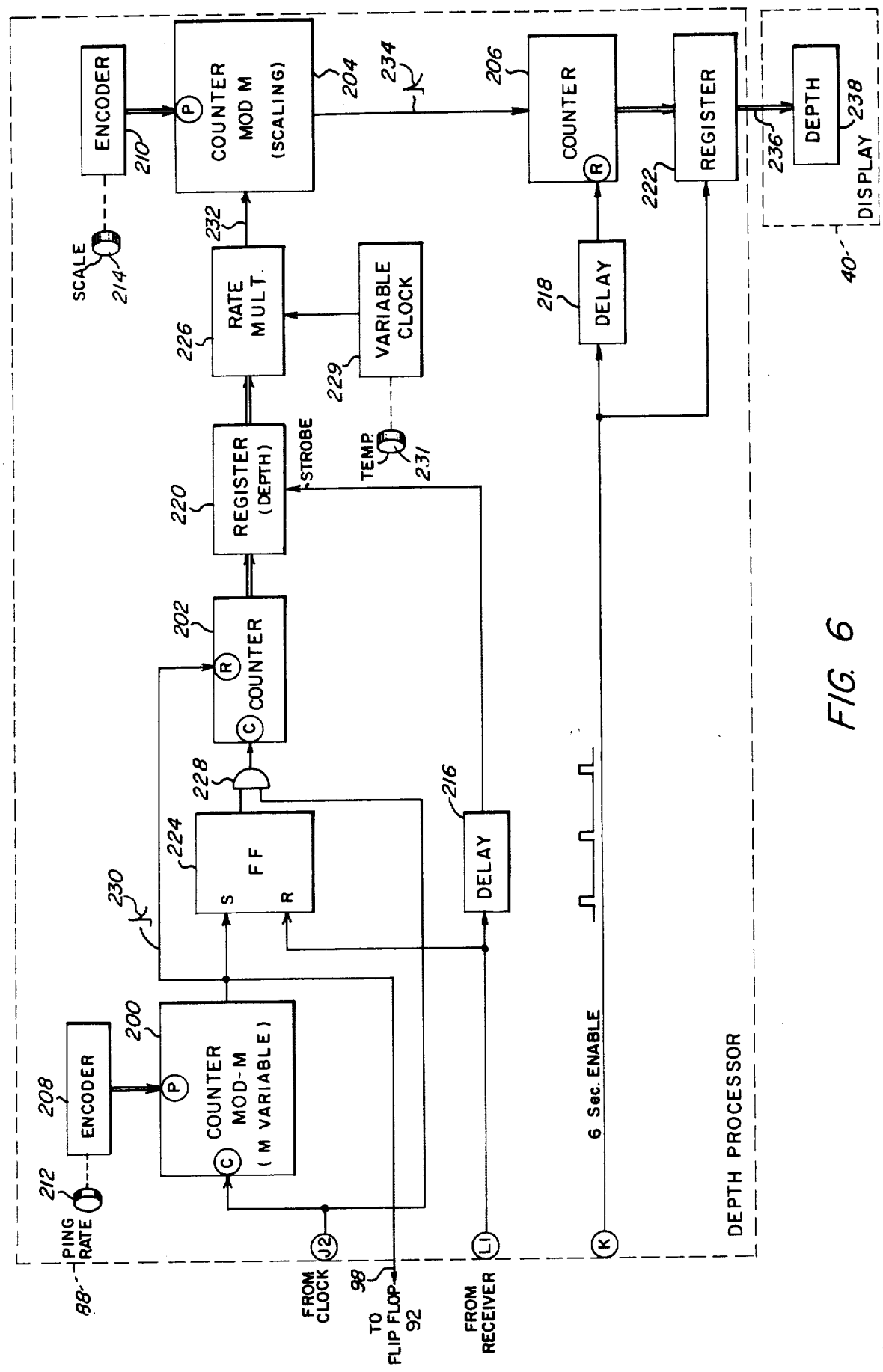
FIG. 6 is a block diagram of a depth processor of FIG. 3 for measuring the elapsed time between a transmission of energy from the transmitter of FIG. 1 and the reception of reflected energy by the receiver of FIG. 1.

Referring now to FIG. 6 there is seen a block diagram of the depth processor 88 which comprises counters 200, 202, 204 and 206, encoders 208 and 210, knobs 212 and 214 coupled respectively to the encoders 208 and 210 for selecting numbers respectively in the encoders, delay units 216 and 218, registers 220 and 222, a flip-flop 224, a rate multiplier 226 which is similar to the rate multiplier 102 previously described, an AND gate 228 and a variable frequency clock 229. The depth processor counts the clock signals provided by the clock 90 at terminal J2 for measuring the time between sonar pinging and for transmitting a signal on line 98 to the flip-flop 92 of FIG. 3 for initiating a pinging of the transmitter 34 of FIG. 1. The processor 88 also provides a measurement of the time elapsed between a pinging by the transmitter 34 and the reception of an echo of sonic energy at the transducers 26 and 28. The processor 88 operates as follows.

The counter 200 counts modulo-M with the number M being preset at the terminal P by the encoder 208. The counter 200 counts the clock pulses provided by terminal J2 and at each count of M provides a pulse signal 230 which is transmitted along line 98 to the flip-flop 92 of FIG. 3. The pulse signal 230 is also applied to the set input terminal of the flip-flop 224 for setting the flip-flop 224, and is also applied to the reset terminal R of the counter 202 for clearing the count of the counter 202. In response to the setting of the flip-flop 224, the AND gate 228 passes clock pulses from terminal J2 to the clock input terminal C of the counter 202. The counter 202 counts the clock pulses incident at its terminal C and provides this count to the register 220. The counter 202 continues to count until the reception of an echo at the forward transducer 26, the reception thereof being indicated by a signal of the receiver at terminal L1 which is communicated to the reset terminal of the flip-flop 224 for resetting the flip-flop 224 and thereby terminating the passage of clock pulses through the AND gate 228. The signal at terminal L1 is also passed, via the delay unit 216, to strobe the register 220 thereby admitting the count of the counter 202 into storage within the register 220. The delay of the delay unit 216 is sufficient to allow a resetting of the flip-flop 224 and a cessation of the counting of the counter 202 prior to the strobing of the register 220. The counter 202 retains its count until the next pinging at which time it is cleared by the pulse signal 230. Thus, it is seen that the register 220 stores a number representing the time elapsed between a pinging by the transmitter 34 and the reception of an echo at the forward transducer 26 of FIG. 1.

The number stored in the register 220 is corrected for the effects of the temperature of the water of the ocean 22 by means of a rate multiplier 226 which receives clock pulse signals from the clock 229. The clock 229 is provided with a knob 231 for adjusting the frequency of clock pulses applied to the rate multiplier 226 to compensate for variations in the speed of propagation of the sonic energy transmitted by the transducer 26 of FIG. 1 due to variations in temperature at various depths of the water of the ocean 22. The number stored in the register 220 is applied to an input terminal of the rate multiplier 226 which, in response thereto, provides a clock pulse signal on line 232 having an average frequency proportional to the number stored in the registers 220. Thus, the clock pulses appearing on line 232 have an average repetition frequency representing the temperature corrected round trip time of a pulse of sonic energy from the forward transducer 26 to the ocean bottom 64 and back to the forward transducer 26. The average repetition frequency of the signal on line 232 therefore represents the depth of the ocean 22.

The counter 204 is utilized to scale the depth to read in feet, meters or yards in the same manner as the scaling operation described previously with reference to the counter 158 of FIG. 5. Thus, the counter 204 is preset to the number M by the encoder 210 and thereafter counts the pulses on line 232 modulo-M and provides a pulse signal 234 at each attainment of a count of M. The repetition frequency of the pulses 234 is therefore proportional to the depth.

A number representing the depth is obtained by counting the pulses 234 over the 6 second interval provided by the previously described signal at terminal K. This is accomplished by the counter 206 which counts the pulses 234. The 6 second signal strobes the register 222 to read the count of the counter 206 and is also applied via the delay unit 218 to the reset terminal of the counter 206 for clearing the count at the termination of the 6 second interval. The delay provided by the delay unit 218 is sufficient to permit reading the count by the register 222 before the clearing of the counter 206. Thus, the register 222 represents a 6 second counting of the train of pulses 234. The number stored in the register 222 equals the depth of the ocean bottom 64 and is communicated via lines 236 to the display 40 for indicating the depth upon an indicator 238.

It is understood that the above described embodiment of the invention is illustrative only and that modifications thereof will occur to those skilled in the art. Accordingly, it is desired that this invention is not to be limited to the embodiment disclosed herein but is to be limited only as defined by the appended claims.

What is claimed is:

1. A speed measurement system comprising:
a transducer system for coupling radiant energy into a medium into which a vehicle is moving;
means coupled to said transducer system for extracting data from a predetermined number of cycles of such part of said radiant energy as is reflected through said medium, said data extracting means comprising a plurality of intermediate storage means each of which stores data obtained respectively from successive ones of said cycles;

memory means coupled to said data extracting means for storing said data;

means coupled to said memory means for providing a periodic signal having said data; and means coupled to said periodic signal providing means for counting cycles of said periodic signal to provide a measure of ships speed.

2. A system according to claim 1 wherein said data extracting means further comprises means coupled to said intermediate storage means for comparing the data of one of said intermediate storage means with a second of said intermediate storage means.

3. A system according to claim 2 wherein said intermediate storage means comprises means for measuring the duration of said predetermined number of cycles.

4. A system according to claim 3 wherein said intermediate storage means comprises a counter and means for transmitting clock pulses to said counter during the duration of said predetermined number of cycles.

5. In combination:

means for receiving radiant energy;

means coupled to said receiving means for making successive measurements of the period of a predetermined number of cycles of said radiant energy;

means coupled to said period measuring means for signaling a substantial equality among a plurality of said measurements; and means coupled to said equality signaling means for generating a periodic signal having a frequency proportional to one of said measurements.

6. A combination according to claim 5 further comprising means coupled to said generating means for measuring the frequency of said periodic signal.

7. A combination according to claim 6 wherein said period measuring means includes means for storing successive ones of said measurements.

8. A combination according to claim 7 wherein said equality signaling means includes means for measuring the difference between successive ones of said stored period measurements.

9. A combination according to claim 8 wherein said period measuring means comprises a counter for counting clock pulses and means responsive to the duration of individual ones of said cycles of said radiant energy for gating the counting of said clock pulses by said counting means during said period of said predetermined number of cycles.

10. A combination according to claim 9 wherein said receiving means includes means for translating a carrier frequency of said radiant energy to an intermediate frequency of lower magnitude than said carrier frequency, said intermediate frequency being coupled to said period measuring means.

11. A combination according to claim 10 wherein said receiving means includes a plurality of transducer elements arranged for receiving radiant energy from a plurality of directions, and wherein said frequency measuring means includes means for arithmetically combining the frequency obtained from said generating means in respect of a radiant energy signal received by one of said transducer elements with the frequency obtained from said generating means in respect of the radiant energy signal received from a second of said transducer elements.

12. A combination according to claim 11 wherein said frequency combining means comprises an up-down counter.

13. A combination according to claim 5 wherein said period measuring means comprises means for translating the frequency of said radiant energy to a lower frequency prior to said measurement of said period.

14. In combination:

means for receiving energy at a first carrier frequency;

means coupled to said receiving means for translating the frequency of said received energy to a second frequency lower than said first frequency;

means coupled to said translating means for making successive measurement of the period of a plurality of cycles of said energy at said second frequency;

means coupled to said period measuring means for generating a signal which varies in accordance with the magnitudes of said successive period measurements; and means coupled to said signal generating means for providing an average value of said signal.

15. A combination according to claim 14 wherein said means for providing said average value provides a signal having a frequency proportional to the average value of said measured periods of said period measuring means.

* * * * *